(12) United States Patent
Lewis et al.

(10) Patent No.: US 6,663,313 B2
(45) Date of Patent: Dec. 16, 2003

(54) MOUNTING SYSTEM FOR SPEED REDUCERS

(75) Inventors: Michael L. Lewis, Maysville, KY (US); Erwin R. Carrigan, Manchester, OH (US); Christopher A. Carrigan, Maysville, KY (US); Steven H. Griggs, Maysville, KY (US)

(73) Assignee: Emerson Power Transmission Manufacturing, L.P., Maysville, KY (US)

( * ) Notice: Subject to any disclaimer, the term of this patent is extended or adjusted under 35 U.S.C. 154(b) by 77 days.

(21) Appl. No.: 09/755,535

(22) Filed: Jan. 5, 2001

(65) Prior Publication Data

US 2002/0090258 A1 Jul. 11, 2002

(51) Int. Cl.$^7$ ............................. F16B 7/04; F16B 2/14
(52) U.S. Cl. ..................... 403/374.3; 403/369; 403/370
(58) Field of Search ................................ 403/365, 366, 403/367, 368, 369, 370, 373, 374.1, 374.3, 335–338; 285/414

(56) References Cited

U.S. PATENT DOCUMENTS

| | | | | |
|---|---|---|---|---|
| 3,590,652 A | * | 7/1971 | Strang | 403/238 |
| 3,887,290 A | * | 6/1975 | Taylor | 403/370 |
| 4,452,547 A | * | 6/1984 | Thiel et al. | 403/370 |
| 4,626,114 A | | 12/1986 | Phillips | |
| 5,197,345 A | * | 3/1993 | Rose | 29/256 |
| 5,551,794 A | * | 9/1996 | Aarre et al. | 403/22 |
| 5,667,333 A | * | 9/1997 | Phillips | 403/3 |
| 5,709,483 A | * | 1/1998 | Martinie | 384/538 |
| 5,746,536 A | * | 5/1998 | Hutchings et al. | 403/358 |
| 5,765,961 A | * | 6/1998 | Phillips | 403/367 |

* cited by examiner

Primary Examiner—Lynne H. Browne
Assistant Examiner—Jori Schiffman
(74) Attorney, Agent, or Firm—Harness, Dickey & Pierce, P.L.C.

(57) ABSTRACT

A mounting system for a speed reducer having a housing with a rotatable input drive coupled with the housing and a gear train coupled with the input to drive an output. The mounting system has a cylinder having an inner and outer surface and two ends. The outer surface includes a portion adapted to couple with the drive train. The outer surface at both ends may have a threaded portion or another securement portion. The inner surface may be tapered from both the ends such that the tapers are substantially symmetrical about the cylinder. A bushing ring, with an internal diameter, may include threads to threadily connect with either threaded end of the output cylinder, or another type of securement may be used. A bushing, which includes a flange and a cylindrical portion, is adapted to couple with the bushing ring. The flange portion couples with the bushing ring on either side of the output cylinder. The cylindrical portion may have an outer tapered surface complementary to the inner tapered surface of the cylinder. The bushing secures the speed reducer with a shaft so that the speed reducer may be secured to the shaft from either end of the cylinder.

34 Claims, 3 Drawing Sheets

MOUNTING SYSTEM FOR SPEED REDUCERS

BACKGROUND AND SUMMARY OF THE INVENTION

The present invention relates to a method of securing power transmission devices to shafts, and more particularly to a system for attaching a hollow sleeve to a shaft by means of a single tapered bushing which can be installed from either end of the sleeve. The system is particularly applicable to devices such as shaft mounted speed reducers where the speed reducer is mounted directly to and is supported by the shaft that it drives.

Such speed reducers are utilized in various types of industrial applications. For example, shaft mounted speed reducers may be used to drive a conveyor. In this application, the speed reducer is ordinarily mounted directly onto the conveyor head shaft. A bracket is typically mounted to the reducer to support a motor which drives the reducer by way of a v-belt drive.

In this type of application, the speed reducer is usually attached to the shaft by means of some form of tapered bushing system which accommodates a range of driven shaft sizes and provides a clearance-free compression fit between the reducers hollow output quill and the driven shaft. Such systems typically utilize either a single bushing mounted from one end of the quill or two bushings mounted on either end of the quill. Since the driven shaft on which the reducer is to be mounted is not always long enough to pass entirely through the reducer's quill, two-bushing systems may not be usable. Because of this unknown application variable, single bushing systems are typically installed from the back side of the quill next to the driven machinery. If the driven shaft is of sufficient length, either system could be applied, however, because space between the reducer and driven machinery is often limited, it would be desirable to have a single bushing system that could also be mounted from the outboard end of the quill at the user's discretion. The present invention provides the art with such a mounting system.

Additional objects and advantages of the present invention will become apparent from the detailed description of the preferred embodiment, and the appended claims and accompanying drawings, or may be learned by practice of the invention.

DETAILED DESCRIPTION OF THE PREFERRED EMBODIMENT

Figure 1:
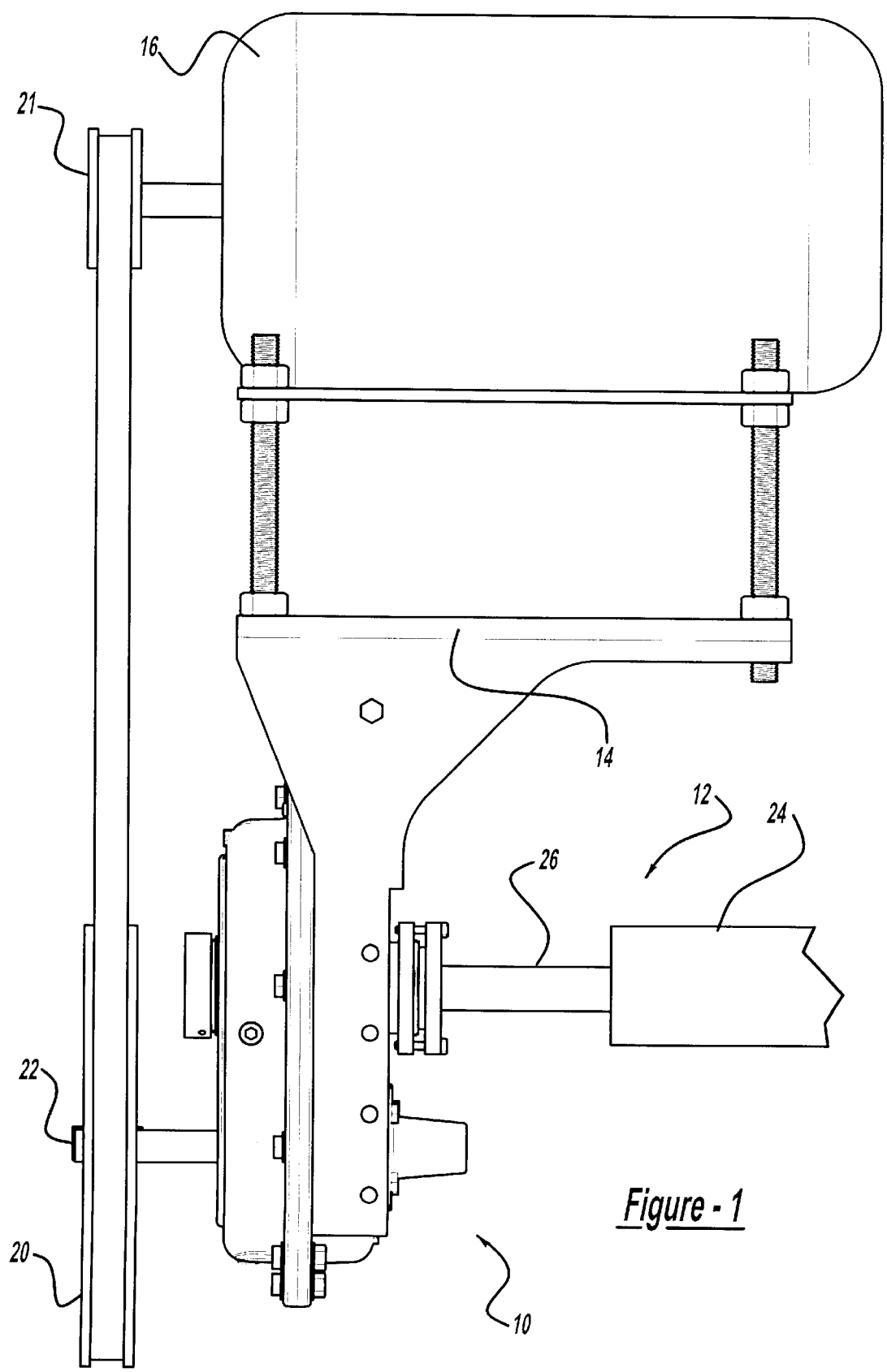
FIG. 1 is a schematic view of a speed reducer mounted onto the head shaft of a belt conveyor.

Turning to FIG. 1, a speed reducer 10 is illustrated mounted to the head shaft of a conveying mechanism 12. A bracket 14 is mounted on the speed reducer 10. also, a drive motor 16 is mounted on the bracket 14. The drive motor 16 includes a sheave 21 which, in turn, is coupled with sheave 20 on input shaft 22 of the speed reducer 10 by v-belt 18. The speed reducer 10 is secured to the head shaft 26 of the conveying roller 24 to drive the conveying roller 24.

Figure 2:
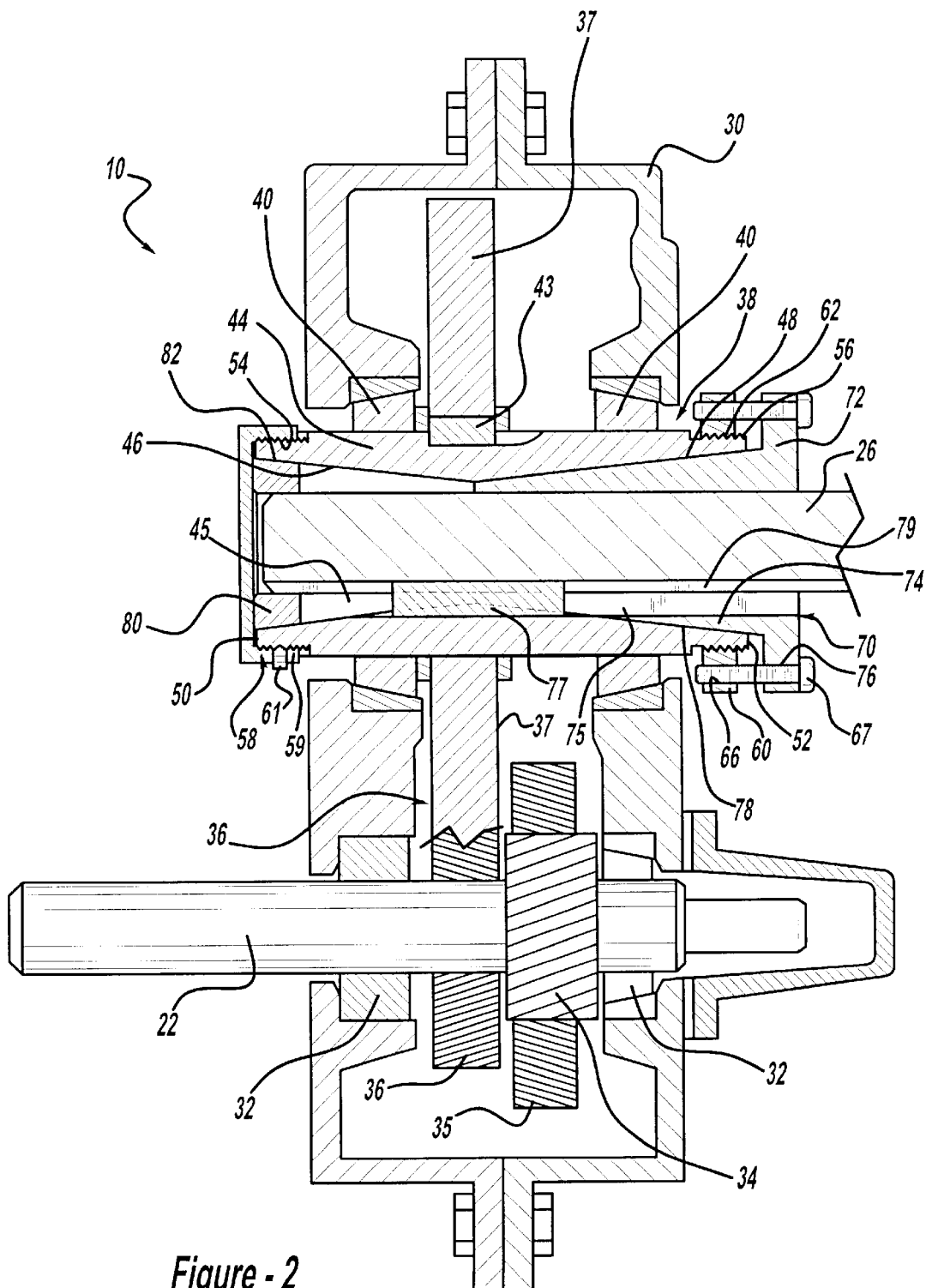
FIG. 2 is a cross-section view of the speed reducer of FIG. 1.

FIG. 2 illustrates a cross-section view of the speed reducer 10. The input shaft 22 drives hollow output quill 44 via gear train 34, 35, 36 and 37. The output quill 44 may also be referred to as a hollow cylinder or output cylinder. The input shaft, gear train and output quill are supported by bearings in housing 30.

The output quill 44 includes a pair of identical inner tapered surfaces 46 and 48. The inner tapered surfaces 46 and 48 define conical surfaces which are symmetrically positioned with respect to one another in the output quill 44. A keyway 45 is cut into the inner tapered surfaces 46, 48. The ends 50, 52 of the quill 44 extend beyond the housing face an equal distance on either side of the housing. The ends 50 and 52 of the quill include identical threads 54 and 56 on the outer cylindrical surface of the output quill 44. The threads 54 and 56 are adapted to receive an end cap 58 or a bushing ring 60. Thus, each thread 54, 56 will receive either an end cap 58 or a bushing ring 60.

The bushing ring 60 has interior threads 62 complementary to the threads 54, 56 on the output quill 44. Thus, the bushing ring 60 may be threaded onto either thread 54, 56. Accordingly, by moving the bushing ring 60 from one thread to the other (FIGS. 2, 3), the user may mount the single tapered bushing from either end of the quill 44. The bushing ring 60 includes a plurality of threaded holes 66 to receive bolts 67 which pass through the flange of bushing 70.

The bushing 70 includes a flange or ring portion 72 and an elongated tapered cone or cylinder portion 74. The flange 72 includes a plurality of holes 76 which enable bolts 67 to pass through the flange into the threaded bores 66 of the bushing ring 60. The bolts 67 are tightened which, in turn, draws the bushing 70 into the output quill to secure the shaft 26 in the output quill 44. The bushing 70 includes an axial slot (not shown) which enables the bushing 70 to circumferentially tighten about the shaft 26. The elongated portion 74 has a tapered external surface 78 which is complementary to the tapered surface 46 and 48 of the quill 44. The elongated tapered portion 74 also includes a keyway 75. A key 77 is inserted into keyways 45, 75, 79 to exert drive between the quill, bushing and shaft 26. The bushing 70 is placed around the shaft 22 and inserted into the quill 44. The bushing 70 extends into the quill 44 such that the end of the tapered portion extends about halfway through the quill 44.

The end cap 58 includes threads 59 to thread onto threads 54, 56 of the output quill 44. The end cap 58 is mounted by hand on the end of the quill opposite the bushing. Also, a soft-point set screw 61 is passed through the skirt on the end cap to lock the end cap in place and prevent it from loosening during operation. The end cap 58 prohibits foreign matter from entering into the quill. The end cap 58 forces the stabilizer ring 80 into position on the shaft 26. Also, the end cap 58 retains the stabilizer ring 80 in position on the shaft 26. Further, the end cap skirt may include a gripping surface to enhance the removal of the end cap 58.

A stabilizer ring 80 is positioned around the shaft 26 adjacent the end cap 58. The stabilizer ring 80 has a tapered outer surface 82 which is complementary to the tapered surfaces 46 and 48 of output quill 44. The stabilizer ring 80 is manufactured from a non-ferrous material and includes a slot on one side (not shown) to enable circumferential contraction around the shaft 26. As the end cap 58 is threaded onto quill 44, the stabilizer ring 80 is forced into the quill causing it to contract until all radial clearance in the assembly has been removed. The stabilizer ring 80 provides a bearing surface for the shaft 26 to reduce wobble and minimize fretting corrosion. The stabilizer ring 80 is installed by hand without the use of tools.

Figure 3:
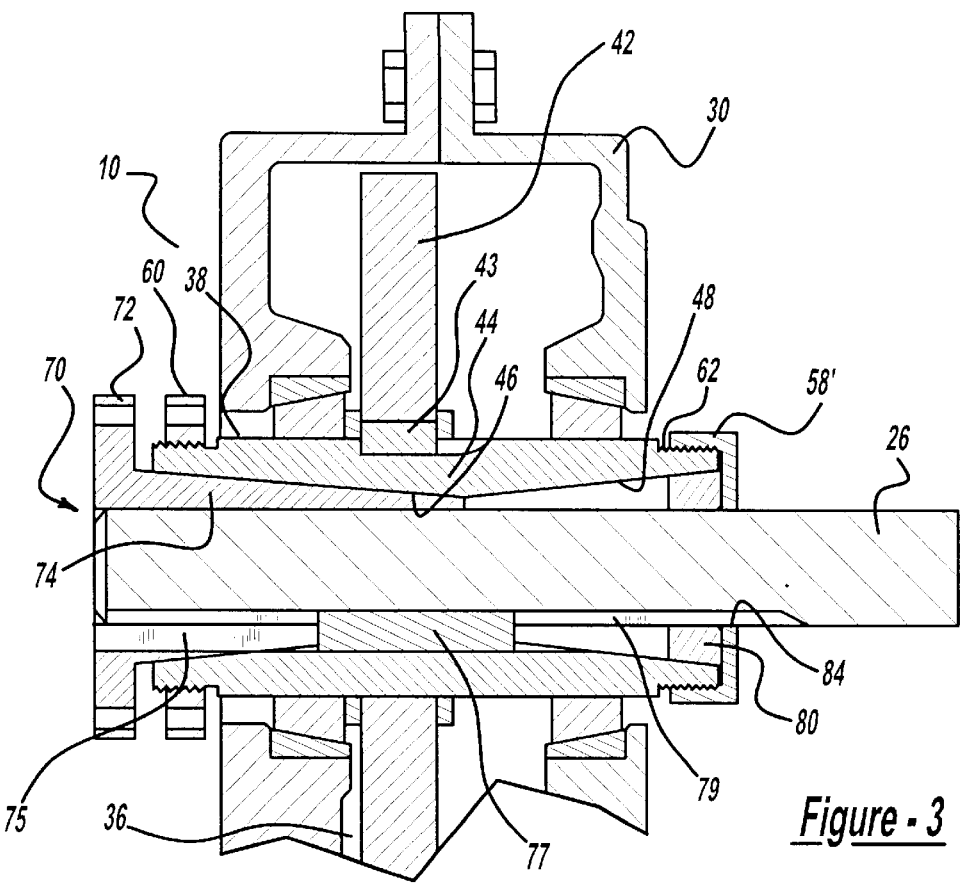
FIG. 3 is a view like FIG. 2 of the output drive with the bushing on the other side of the reducer.

Turning to FIG. 3, the bushing 70 is illustrated on the other side of the reducer 10. Here, the elements are the same, except for the modification of the end cap 58'. Here, the end cap 58' includes a central aperture 84, enabling passage of the shaft 26 through the end cap 58'. Thus, the reducer 10 may be secured to the shaft 26 from either side of the reducer by a single removable bushing 70. Also, the end cap 58' may be used in FIG. 2 with a plug or cap inserted into the central aperture 84. The plug or cap could be made from a plastic or other non-metallic material.

Figure 4:
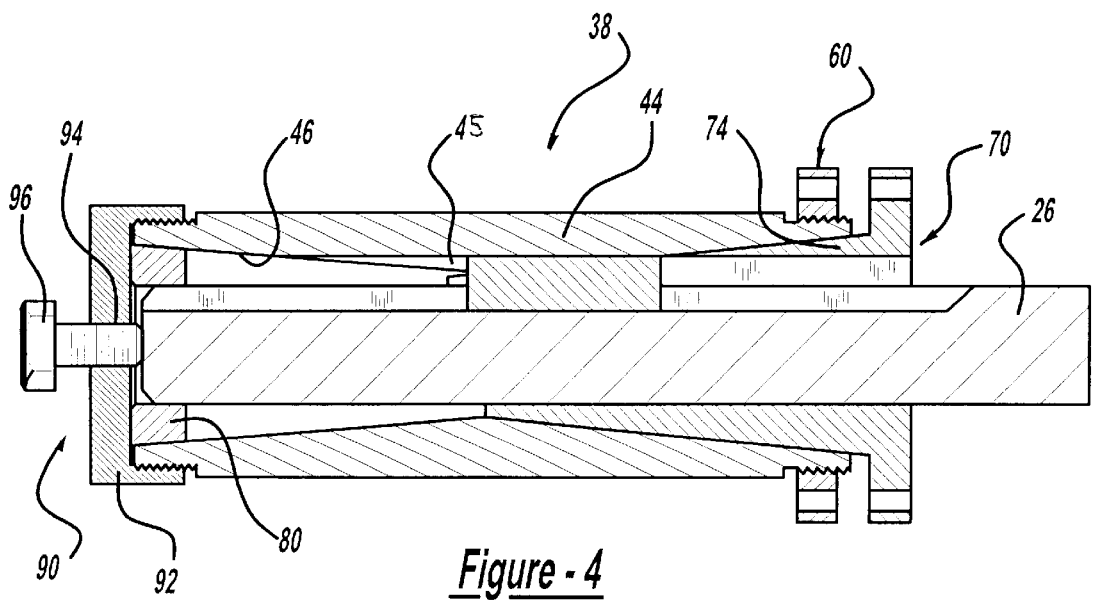
FIG. 4 is a view like FIG. 2 of the output drive including a removal-assist tool.

Turning to FIG. 4, an additional embodiment is illustrated. Here, the elements which are the same are identified with the same reference numerals. The difference here is that the end cap has been modified to serve as a removal-assist tool 90. The removal-assist tool 90 includes end cap 92 substantially similar to that previously described. However, it includes a threaded hole 94 with a bolt 96. Here, the bolt 96 would be threaded through the hole 94 to apply a force on the shaft. The force would assist in pushing the speed reducer 10 off of the shaft 26.

While the above detailed description describes the preferred embodiment of the present invention, the invention is susceptible to modification, variation, and alteration without deviating from the scope and fair meaning of the subjoined claims.

What is claimed is:

1. A mounting system for speed reducers, comprising:
   a hollow cylinder having an inner and an outer surface and two ends, the outer surface having a portion adapted for coupling with a drive train of a speed reducer, said outer surface at said two ends including a threaded portion, said inner surface having a tapered surface;
   a bushing ring having a threaded inner diameter for threadily connecting with either threaded portion of said two ends of said cylinder and a threaded aperture adapted to accept a threaded member;
   a bushing having a ring portion and a cylindrical portion extending from said ring portion, said cylindrical portion having a tapered outer surface, said ring portion having an aperture adapted to receive the threaded member extending into the threaded aperture of the bushing ring so that rotation of the threaded member drives the tapered outer surface against the tapered inner surface to couple said bushing ring on either end of said cylinder so that said cylinder is adapted to be coupled with a shaft from either end of said cylinder; and
   an end cap threadily received on the other of said two ends.

2. The mounting system according to claim 1, further comprising a stabilizer ring adapted to be positioned on a shaft adjacent said end cap.

3. The mounting system according to claim 1, wherein said end cap includes an aperture adapted to receive the shaft.

4. The mounting system according to claim 3, wherein a plug is positioned in said aperture.

5. The mounting system according to claim 1, wherein a gripping surface is on said end cap for enhancing rotation of said end cap.

6. A mounting system for speed reducers, comprising:
   a hollow cylinder having an inner and an outer surface and two ends, said inner surface being tapered along a length from said two ends to about a midpoint of said inner surface and such that the tapers are substantially symmetric on said cylinder, the outer surface having a portion adapted for coupling with a drive train of a speed reducer, said outer surface at said two ends including a portion for coupling with a bushing ring;
   a bushing ring having an inner diameter for connecting with either end of said cylinder; and
   a bushing adapted for coupling with a shaft, said bushing having a ring portion and a cylindrical portion extending from said ring portion, said ring portion coupling with said bushing ring on either side of said cylinder, and said cylindrical portion having an outer tapered surface having a length substantially equal to the length of either tapered inner surface for mating with either tapered inner surface of said cylinder so that said cylinder is adapted to be coupled with a shaft from either side of said cylinder.

7. The mounting system according to claim 6, further comprising an end cap received on the other of said two ends.

8. The mounting system according to claim 7, further comprising a stabilizer ring adapted to be positioned on a shaft adjacent said end cap.

9. The mounting system according to claim 8, wherein said stabilizer ring has a tapered outer surface corresponding to the inner tapered surface of said cylinder.

10. A mounting system for speed reducers, comprising:
    a hollow cylinder having an inner and an outer surface and two ends, said inner surface being tapered from said two ends such that the tapers are substantially symmetric on said cylinder, the outer surface having a portion adapted for coupling with a drive train of a sped reducer, said outer surface at said two ends including a threaded portion for coupling with a bushing ring;
    a bushing ring having a threaded inner diameter for threadily connecting with either threaded portion of said two ends of said cylinder;
    a bushing adapted for coupling with a shaft, said bushing having a ring portion and a cylindrical portion extending from said ring portion, said ring portion coupling with said bushing ring on either side of said cylinder, and said cylindrical portion having an outer tapered surface for mating with either tapered inner surface of said cylinder so that said cylinder is adapted to be coupled with a shaft from either side of said cylinder; and
    a stabilizer ring having a tapered outer surface corresponding to the inner tapered surface of said cylinder.

11. The mounting system according to claim 10, further comprising an end cap threadily received on the other of said two ends.

12. The mounting system according to claim 11, wherein said stabilizer ring is adapted to be positioned on a shaft adjacent said end cap.

13. The mounting system according to claim 11, wherein said end cap includes an aperture adapted to receive the shaft.

14. The mounting system according to claim 13, wherein a plug is positioned in said aperture.

15. The mounting system according to claim 11, wherein a gripping surface is on said end cap for enhancing rotation of said end cap.

16. A speed reducer, comprising:
    a housing;
    an input drive coupled for rotation with said housing;
    a gear train coupled with said input drive;
    an output coupled with said gear train being driven by said input drive, said output comprising:

an output cylinder having an inner and outer surface and two ends, the outer surface including a portion coupled with said gear train, said outer surface at said two ends including a threaded portion;

a bushing ring having a threaded inner diameter to provide a threaded connection with either end of said output cylinder;

a bushing adapted for coupling with a rotating shaft, said bushing having a ring portion and a cylindrical portion extending from said ring portion, said ring portion coupling with said bushing ring on either side of said output cylinder for securing said speed reducer onto the shaft from either end of said cylinder; and an end cap is threaded on the other end of said output cylinder;

wherein the threaded connection between the bushing ring and either end of the output cylinder enables the bushing ring to be readily removable from either end of the cylinder so that the threaded inner diameter of the bushing ring can be relocated to cooperate with the threads of the other end of said output cylinder for securing said speed reducer onto the shaft from the other end of said cylinder.

17. The speed reducer according to claim 16, wherein a stabilizer ring is positioned on a shaft adjacent said end cap.

18. The speed reducer according to claim 16, wherein said end cap includes an aperture for receiving a shaft.

19. The speed reducer according to claim 16, wherein said end cap includes a thread bore for receiving a thread bolt.

20. A speed reducer, comprising:

a housing;

an input drive coupled for rotation with said housing;

a gear train coupled with said input drive;

an output coupled with said gear train being driven by said input drive, said output comprising:

an output cylinder having an inner and outer surface and two ends, the outer surface including a portion coupled with said gear train, said outer surface at said two ends including a portion for coupling with a bushing ring, said inner surface being tapered along a length from said two ends to about a midpoint of said inner surface and such that the tapers are substantially symmetric on said output cylinder;

a bushing ring having an inner diameter for connecting with either end of said output cylinder; and a bushing adapted for coupling with a shaft, said bushing having a ring portion and a cylindrical portion extending from said ring portion, said ring portion coupling with said bushing ring on either side of said output cylinder and said cylindrical portion having an outer tapered surface having a length substantially equal to the length of either tapered inner surface for mating with either tapered inner surface of said output cylinder enabling said speed reducer to be secured to a shaft from either end of said cylinder.

21. The speed reducer according to claim 20, wherein an end cap is received on the other end of said output cylinder.

22. The speed reducer according to claim 21, wherein a stabilizer ring is positioned on a shaft adjacent said end cap.

23. The speed reducer according to claim 22, wherein said stabilizer ring has a tapered outer surface corresponding to the inner tapered surface of said output cylinder.

24. A speed reducer, comprising:

a housing;

an input drive coupled for rotation with said housing;

a gear train coupled with said input drive;

an output coupled with said gear train being driven by said input drive, said output comprising:

an output cylinder having an inner and outer surface and two ends, the outer surface including a portion coupled with said gear train, said outer surface at said two ends including a matching threaded portion on each of the two ends, said inner surface being tapered from said two ends such that the tapers are substantially symmetric on said output cylinder;

a bushing ring having a threaded inner diameter for threadily connecting with the matching threaded portion of either end of said output cylinder;

a bushing having a ring portion and a cylindrical portion extending from said ring portion, a coupling attaching said ring portion with said bushing ring on either side of said output cylinder and said cylindrical portion having an outer tapered surface for mating with either tapered inner surface of said output cylinder, the coupling enabling said speed reducer to be secured to a shaft from either end of said cylinder by driving the tapered surfaces together; and an end cap threaded on the matching threaded portion of the other end of said output cylinder;

wherein the matching threaded portion on each of the two ends of the output cylinder enables the bushing ring and the end cap to be readily removable from the output cylinder and enables the relocation of the bushing ring to the other end of said output cylinder in place of said end cap and enables the relocation of the end cap to the end of the output cylinder in place of said bushing ring.

25. The speed reducer according to claim 24, wherein a stabilizer ring is positioned on a shaft adjacent said end cap.

26. The speed reducer according to claim 25, wherein said stabilizer ring has a tapered outer surface corresponding to the inner tapered surface of said output cylinder.

27. The speed reducer according to claim 24, wherein said end cap includes an aperture for receiving a shaft.

28. The speed reducer according to claim 24, wherein said end cap includes a thread bore for receiving a thread bolt.

29. A mounting system for speed reducers, comprising:

a hollow cylinder having an inner and an outer surface and two ends, the outer surface having a portion adapted for coupling with a drive train of a speed reducer, said outer surface at said two ends including a threaded portion;

a bushing ring having a threaded inner diameter for threadily connecting with either threaded end of said cylinder;

a bushing adapted for coupling with a shaft, said bushing having a ring portion and a cylindrical portion extending from said ring portion, said ring portion coupling with said bushing ring on either side of said cylinder so that said cylinder is adapted to be coupled with a shaft from either side of said cylinder; and said end cap including an aperture adapted to receive the shaft and having a plug positioned in said aperture.

30. A mounting system for speed reducers, comprising:

a hollow cylinder having an inner and an outer surface and two ends, said inner surface being tapered from said two ends such that the tapers are substantially symmetric on said cylinder, the outer surface having a portion adapted for coupling with a drive train of a speed reducer, said outer surface at said two ends including a portion for coupling with a bushing ring;

a bushing ring having an inner diameter for connecting with either end of said cylinder;

a bushing adapted for coupling with a shaft, said bushing having a ring portion and a cylindrical portion extending from said ring portion, said ring portion coupling with said bushing ring on either side of said cylinder, and said cylindrical portion having an outer tapered surface for mating with either tapered inner surface of said cylinder so that said cylinder is adapted to be coupled with a shaft from either side of said cylinder;

an end cap received on the other of said cylinder end; and a stabilizer ring adapted to be positioned on a shaft adjacent said end cap; said stabilizer ring having a tapered outer surface corresponding to the inner tapered surface of said cylinder.

31. A mounting system for speed reducers, comprising:

a hollow cylinder having an inner and an outer surface and two ends, said inner surface being tapered from said two ends such that the tapers are substantially symmetric on said cylinder, the outer surface having a portion adapted for coupling with a drive train of a speed reducer, said outer surface at said two ends including a portion for coupling with a bushing ring;

a bushing ring having a threaded inner diameter for threadily connecting with either threaded end of said cylinder;

a bushing adapted for coupling with a shaft, said bushing having a ring portion and a cylindrical portion extending from said ring portion, said ring portion coupling with said bushing ring on either side of said cylinder, and said cylindrical portion having an outer tapered surface for mating with either tapered inner surface of said cylinder so that said cylinder is adapted to be coupled with a shaft from either side of said cylinder; and an end cap threadily received on the other of said cylinder ends, said end cap including an aperture adapted to receive the shaft, and having a plug positioned in said aperture.

32. A mounting system for speed reducers, comprising:

a hollow cylinder having an inner and an outer surface and two ends, said inner surface being tapered from said two ends such that the tapers are substantially symmetric on said cylinder, the outer surface having a portion adapted for coupling with a drive train of a speed reducer, said outer surface at said two ends including a portion for coupling with a bushing ring;

a bushing ring having a threaded inner diameter for threadily connecting with either threaded end of said cylinder;

a bushing adapted for coupling with a shaft, said bushing having a ring portion and a cylindrical portion extending from said ring portion, said ring portion coupling with said bushing ring on either side of said cylinder, and said cylindrical portion having an outer tapered surface for mating with either tapered inner surface of of said cylinder;

an end cap threadily received on the other of said cylinder ends; and a stabilizer ring adapted to be positioned on a shaft adjacent said end cap, said stabilizer ring having a tapered outer surface corresponding to the inner tapered surface of said cylinder.

33. A speed reducer, comprising:

a housing;

an input drive coupled for rotation with said housing;

a gear train coupled with said input;

an output coupled with said gear train being driven by said input, said output comprising:

an output cylinder having an inner and outer surface and two ends, the outer surface including a portion coupled with said drive train, said outer surface at said two ends including a portion for coupling with a bushing ring, said inner surface being tapered from said two ends such that the tapers are substantially symmetric on said output cylinder;

a bushing ring having an inner diameter for connecting with either end of said output cylinder;

a bushing adapted for coupling with a shaft, said bushing having a ring portion and a cylindrical portion extending from said ring portion, said ring portion coupling with said bushing ring on either side of said output cylinder and said cylindrical portion having an outer tapered surface for mating with either tapered inner surface of said output cylinder enabling said reducer to be secured to a shaft from either end of said cylinder;

an end cap received on the other end of said output cylinder; and a stabilizer ring positioned on a shaft adjacent said end cap, said stabilizer ring having a tapered outer surface corresponding to the inner tapered surface of said output cylinder.

34. A speed reducer, comprising:

a housing;

an input drive coupled for rotation with said housing;

a gear train coupled with said input;

an output coupled with said gear train being driven by said input, said output comprising:

an output cylinder having an inner and outer surface and two ends, the outer surface including a portion coupled with said drive train, said outer surface at said two ends including a threaded portion, said inner surface being tapered from said two ends such that the tapers are substantially symmetric on said output cylinder;

a bushing ring having a threaded inner diameter for threadily connecting with either end of said output cylinder;

a bushing having a ring portion and a cylindrical portion extending from said ring portion, said ring portion coupling with said bushing ring on either side of said output cylinder and said cylindrical portion having an outer tapered surface for mating with either tapered inner surface of said output cylinder enabling said speed reducer to be secured to a shaft from either end of said cylinder;

an end cap threaded on the other end of said output cylinder; and a stabilizer ring positioned on a shaft adjacent said end cap, said stabilizer ring having a tapered outer surface corresponding to the inner tapered surface of said output cylinder.

* * * * *

UNITED STATES PATENT AND TRADEMARK OFFICE
CERTIFICATE OF CORRECTION

PATENT NO. : 6,663,313 B2  Page 1 of 1
DATED : December 16, 2003
INVENTOR(S) : Michael L. Lewis et al.

It is certified that error appears in the above-identified patent and that said Letters Patent is hereby corrected as shown below:

<u>Column 7,</u>
Line 59, after "cylinder" insert -- so that said cylinder is adapted to be coupled with a shaft from either side of said cylinder --.

Signed and Sealed this

Twenty-seventh Day of April, 2004

JON W. DUDAS
*Acting Director of the United States Patent and Trademark Office*